(12) United States Patent  (10) Patent No.: US 9,399,413 B2
Phinney  (45) Date of Patent: Jul. 26, 2016

(54) SYSTEM FOR PREVENTING ACCUMULATION OF DEBRIS IN RAILS CARRYING MOVABLE SEATS

(71) Applicant: American Seating Company, Grand Rapids, MI (US)

(72) Inventor: Randy P. Phinney, Grant, MI (US)

(73) Assignee: American Seating Company, Grand Rapids, MI (US)

( * ) Notice: Subject to any disclaimer, the term of this patent is extended or adjusted under 35 U.S.C. 154(b) by 0 days.

(21) Appl. No.: 14/208,207

(22) Filed: Mar. 13, 2014

(65) Prior Publication Data

US 2014/0265463 A1  Sep. 18, 2014

Related U.S. Application Data

(60) Provisional application No. 61/788,717, filed on Mar. 15, 2013.

(51) Int. Cl.
  *B60N 2/07* (2006.01)
(52) U.S. Cl.
  CPC .................................. *B60N 2/0725* (2013.01)
(58) Field of Classification Search
  CPC ................................................... B60N 2/0725
  USPC ........................................... 296/65.01, 65.13
  See application file for complete search history.

(56) References Cited

U.S. PATENT DOCUMENTS

| | | | |
|---|---|---|---|
| 4,475,701 A | | 10/1984 | Martin |
| 4,723,732 A | * | 2/1988 | Gorges ........................ 244/118.6 |
| 4,936,527 A | * | 6/1990 | Gorges ........................ 244/118.6 |
| 5,188,329 A | | 2/1993 | Takahara |
| 5,275,369 A | | 1/1994 | Kamata et al. |
| 5,285,993 A | | 2/1994 | Kamata et al. |
| 6,145,911 A | * | 11/2000 | Sturt et al. ................. 296/65.01 |
| 6,527,566 B1 | | 3/2003 | Lambiaso |
| 7,073,764 B2 | | 7/2006 | Matsuhiro |
| 7,172,155 B2 | | 2/2007 | Feist et al. |
| 7,182,292 B2 | * | 2/2007 | Howard et al. ........... 244/122 R |
| 7,185,850 B2 | | 3/2007 | Callahan et al. |
| 7,191,981 B2 | * | 3/2007 | Laib et al. .................. 244/118.6 |
| 7,350,853 B2 | * | 4/2008 | Fitze ......................... 296/193.07 |
| 7,988,231 B2 | * | 8/2011 | Phinney ......................... 297/257 |
| 8,033,501 B2 | * | 10/2011 | Callahan et al. ........... 244/118.6 |
| 2007/0170743 A1 | * | 7/2007 | Kinoshita et al. .......... 296/65.13 |
| 2011/0115246 A1 | | 5/2011 | Beyer |
| 2014/0097662 A1 | * | 4/2014 | Kohn et al. ................. 297/463.1 |

FOREIGN PATENT DOCUMENTS

| | | | |
|---|---|---|---|
| FR | 2848926 A1 | * | 6/2004 |
| JP | 11255005 A | * | 9/1999 |
| JP | 2000158994 A | * | 6/2000 |

(Continued)

*Primary Examiner* — H Gutman
(74) *Attorney, Agent, or Firm* — Clark & Brody (57) ABSTRACT

A movable track cover includes a cover segment mounted for movement transverse to the direction of tracks that carry a movable seat between first and second positions. The cover segment extends over the track to prevent debris from entering track when the seat is in the first location and the second location and also allows the seat pedestal supporting the movable seat to move along said track. A positioning element is connected to the seat pedestal to move the cover segment from said first position to said second position in coordination with movement of said seat along said track.

11 Claims, 7 Drawing Sheets

(56) References Cited

FOREIGN PATENT DOCUMENTS

| JP | 2005008104 | A | * | 1/2005 |
| JP | 2005225256 | A | * | 8/2005 |
| JP | 2005271804 | A | * | 10/2005 |
| JP | 2006315542 | A | * | 11/2006 |
| JP | 2013189167 | A | * | 9/2013 |

* cited by examiner

SYSTEM FOR PREVENTING ACCUMULATION OF DEBRIS IN RAILS CARRYING MOVABLE SEATS

TECHNICAL FIELD

This invention relates to seating systems having seats movably mounted on tracks for movement along the tracks.

BACKGROUND OF THE INVENTION

It is known to provide a vehicle, such as a public bus or a motor coach, with seats that can be moved to provide an open space, for example, for securing a mobility aid in the vehicle. These seats are often provided with supporting pedestals that are mounted on rails so they can be moved along the rails between positions that accommodate ambulatory passengers and positions that provide space for securing a mobility aid.

A known type of rail provides a slot that receives a portion of a pedestal to allow the seats to move along the rails by sliding. A problem frequently encountered with these rails is their tendency to accumulate debris through the slots. This accumulated debris must be removed regularly by maintenance personnel to prevent a build-up of debris that would interfere with easy movement of the seats. Such maintenance can be costly. In addition, the open slot can present an annoyance to persons wearing high-heeled shoes or even a danger under certain circumstances. Accordingly, it has been proposed to provide the movable seats with track covers that move with the seats to maintain the track covered as the seats are moved to deployed or stored positions.

Known systems that provide movable track covers can be effective if the distances by which the seats must move are restricted. In a common situation, however, the seats must be moved by distances to place seats quite close to each other. This is especially the case in a vehicle that requires the seats to be moved to positions that can accommodate a mobility aid. In this case the seats must be moved closer to each other than they are when in the positions that accommodate ambulatory passengers. But, when the seats with movable track covers move on the same tracks, the minimum distance between seats is the sum of the lengths of the movable track covers. One proposed solution has been to provide two sets of parallel tracks, with the two sets offset laterally from each other so that the seats and the movable track covers are on separate tracks. In this arrangement, the distance by which one set of seats and its accompanying track covers can move is not affected by the second set of track covers because they are on the adjacent set of tracks. While this system has been successful, it can be more difficult to retrofit into existing systems.

SUMMARY OF THE INVENTION

In accordance with the invention a track cover system includes a series of discrete, individually movable track cover segments that are arranged linearly along each track to cover the track when in one orientation or be moved aside to a second orientation by a moving chair pedestal to allow the chair to move along the track. The cover segment then automatically moves to an orientation in which it covers the track as the chair moves past the particular cover. When a chair is in a desired position, the pedestal itself generally covers the track, and the cover will be held in its uncovered orientation. In some instances, as will be described in more detail below, it is preferable to eliminate a movable cover in those locations where a seat pedestal will cover the rail except for a brief time when the seats are being rearranged.

In preferred embodiments, the covers are mounted for pivotal motion between covered and uncovered orientations. As the seat pedestals move along the seat tracks the pedestals are equipped with positioning elements that lift and rotate the covers about an axis parallel to the tracks so the covers lie flat adjacent the track, allowing the seat pedestal to move along the track. In other embodiments, however, the covers may be mounted for linear movement laterally, whereby they are pushed aside laterally as the seat pedestal moves along the track.

DETAILED DESCRIPTION OF THE PREFERRED EMBODIMENTS

Figure 1:
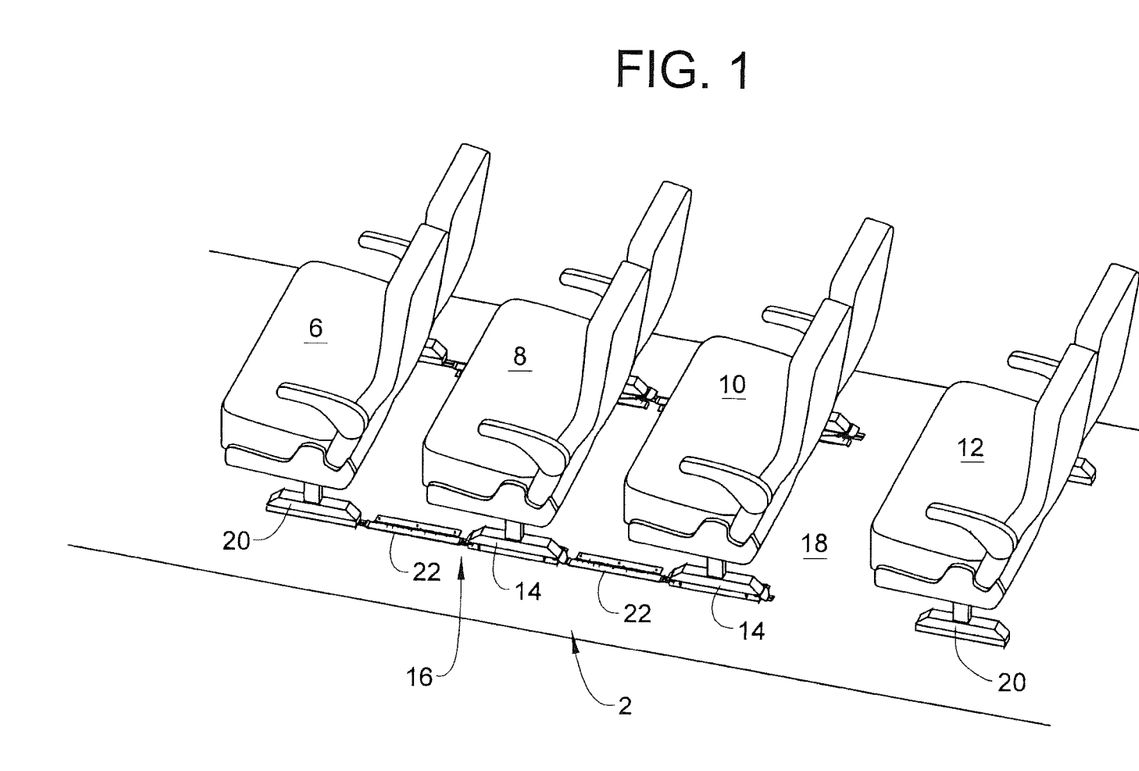
FIG. 1 shows a portion of a vehicle having a seating area with movable seats and track covers in accordance with a first embodiment of the invention.

FIG. 1 illustrates a seating area 2 of a vehicle that may, for example, be a city transit bus, a motor coach, or any other vehicle having movable seats. In the embodiment of FIG. 1, the seating area illustrated is that of a transit bus or motor coach with a row of seats 6, 8, 10, and 12. In this example, seats 8 and 10 are supported by respective movable pedestals 14. The movable pedestals 14 are mounted on parallel rails 16 that are mounted on the floor 18 of the vehicle as is generally known in the art. Seats 6 and 12 are supported by stationary pedestals 20 because in the embodiment illustrated these seats are not designed to move with respect to the vehicle.

Figure 2:
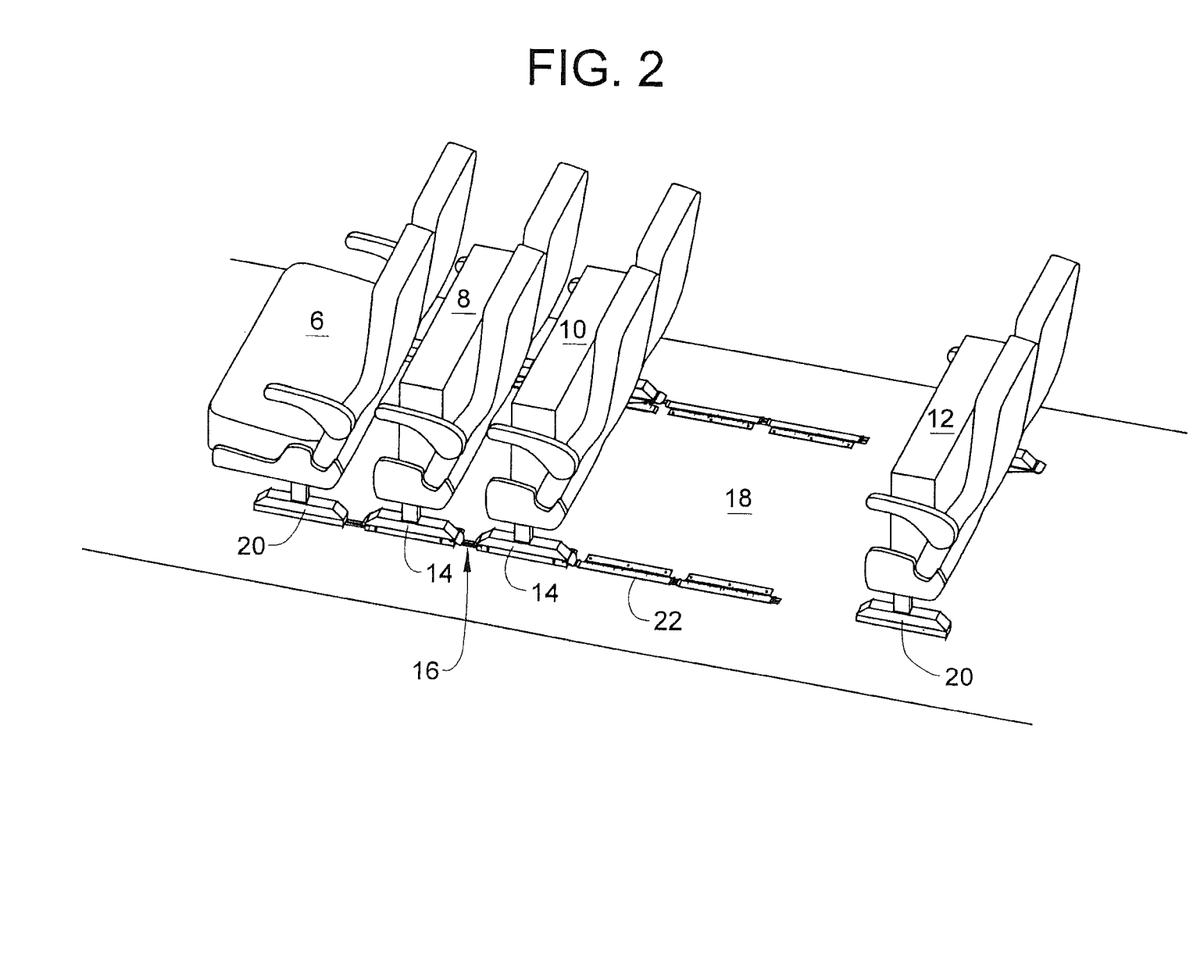
FIG. 2 shows a seating section according to FIG. 1 where two of the seats have been moved to positions that create an area for accommodating a passenger in a mobility aid.

FIG. 2 illustrates the embodiment of FIG. 1 with the seats 8 and 10 moved forward to provide an open area between seats 10 and 12 for receiving a mobility aid (not shown) such as a wheelchair or a scooter. It will be appreciated that in the embodiment illustrated the bottoms of the seats 8 and 10 fold up to allow these seats to be moved as close as possible to each other as well as to seat 6. The mobility-aid area may also be provided with securement elements, such as straps or other devices known in the art to secure the mobility aid to the vehicle.

In accordance with the invention, the rails 16 are provided with discrete track cover plate segments 22 of a segmented cover system.

Figure 3:
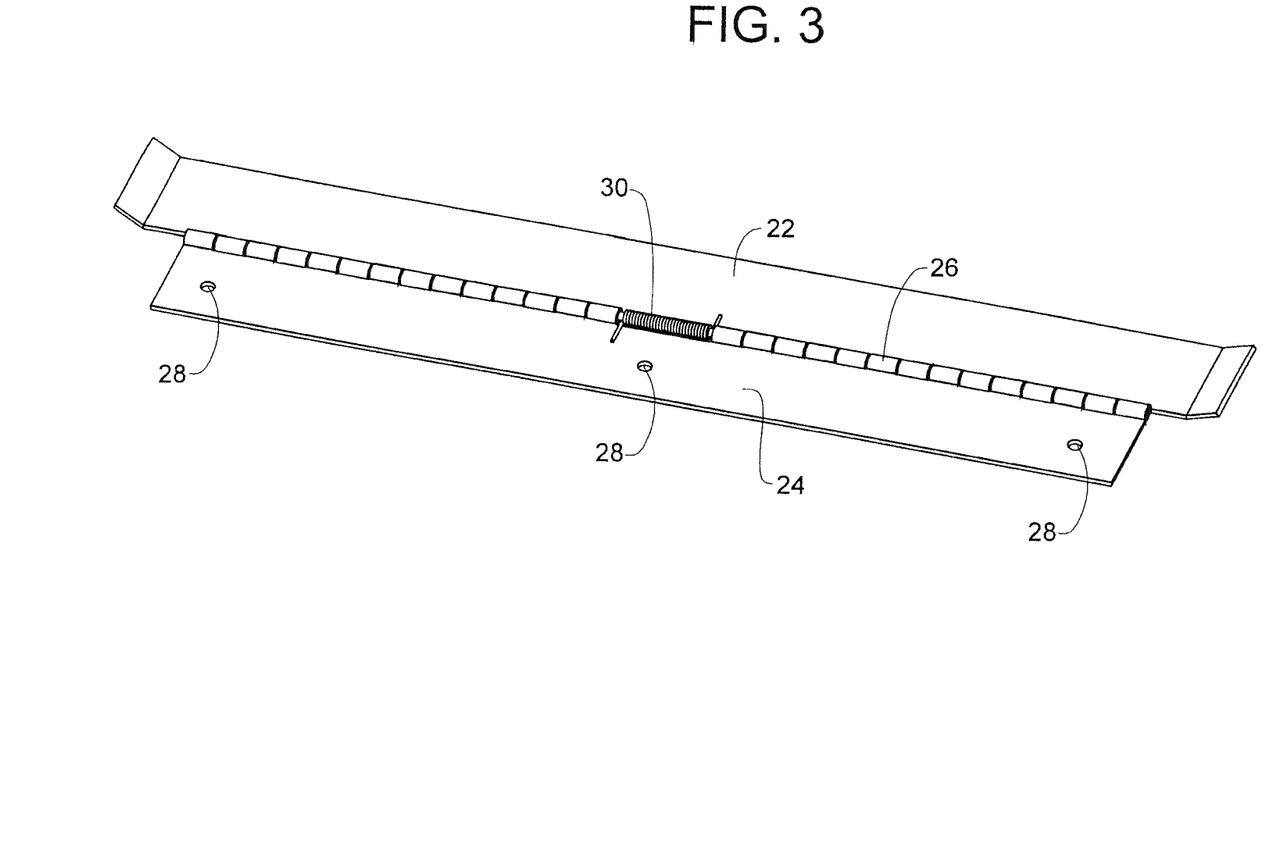
FIG. 3 is a perspective of a hinged track cover segment.

FIG. 3 illustrates a preferred embodiment of a track cover plate segment 22 of the segmented cover system that comprises a plurality of track cover plate segments 22. The track cover plate segment 22 is mounted to the vehicle so that it can be pushed aside by a moving pedestal 14 whereby the pedestal can slide along track 16. In the embodiment illustrated in FIG. 3, track cover plate segment 22 is pivotally attached to a mounting plate 24 at a piano-hinge type connection 26. The mounting plate can be attached to the floor of the vehicle by screws passing through holes 28 and as well by any of several known fastening mechanisms such as adhesives, welding, brazing, rivets, and the like. Moreover, the actual type of hinge connection may be any of a variety of known pivotal connections. The preferred piano hinge connection further includes a return component, which in this embodiment is a spring 30 (or multiple springs) that resiliently biases the track cover plate segment 22 away from the mounting plate 24 so that it will return to the orientation shown in FIG. 3 unless a force is applied to rotate it against the force of the spring to move rotationally to a position lying on top of the mounting plate as illustrated in FIGS. 5 through 10.

Figure 4:
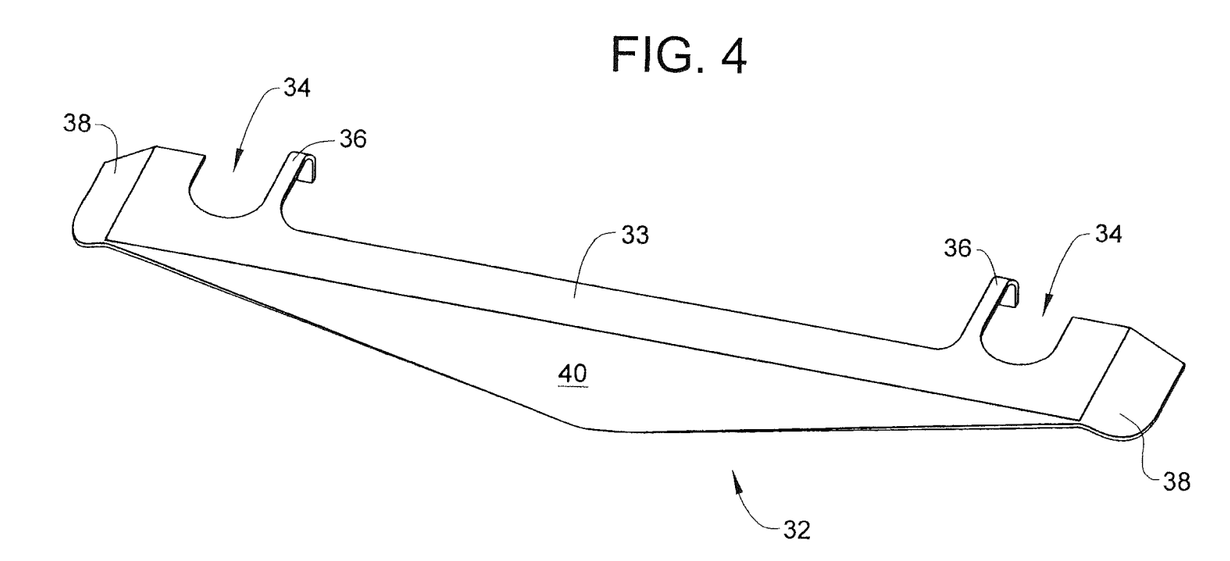
FIG. 4 is a perspective of a lifting plate in accordance with the invention.

FIG. 4 illustrates a preferred positioning element that is shown as a lifting plate 32, which is carried by a moving pedestal to lift and rotate a track cover plate segment 22 as a seat moves along the track. The lifting plate shown in FIG. 4 is configured to be attached to a pedestal 14, but it could be integral with the pedestal or otherwise arranged to move in coordinated fashion with the seat. One of the advantages of the preferred embodiment disclosed is that it can be retrofitted to an existing system. Thus, the lifting plate 32 includes an upper surface 33 with cutouts 34 that are configured to receive shafts (not shown) in the pedestals 14 during the retrofit. Tabs 36 are initially straight but can be bent over at their ends as shown to engage a far edge of a pedestal 14 to secure the lifting plate to the pedestal for movement therewith. Lifting plate 32 includes lifting ends 38 at opposite ends of the lifting plate and a rotating edge 40. The functions of these elements will become apparent in connection with FIGS. 5 through 10.

The lifting plate may also take different shapes and need not have the solid plate-like structure illustrated. For example the lifting plate can comprise two separate articles performing the lifting and rotating actions.

As discussed above in connection with FIGS. 1 and 2, a plurality of discrete track cover plate segments 22 is arranged with respect to a rail or track 16 so that the track cover plate segments 22 cooperate to cover the track 16 and prevent the entry of debris. The length of a cover 22 can be substantially the length of a pedestal base so that when a pedestal base is aligned with a track cover plate segment 22, the pedestal base will prevent the accumulation of debris. In other layouts, the cover segments can be shorter than the pedestal base. For example two or more track cover plate segments could be used in place of each of the single track cover plate segments shown to provide flexibility in the positioning of the seats.

Figure 5:
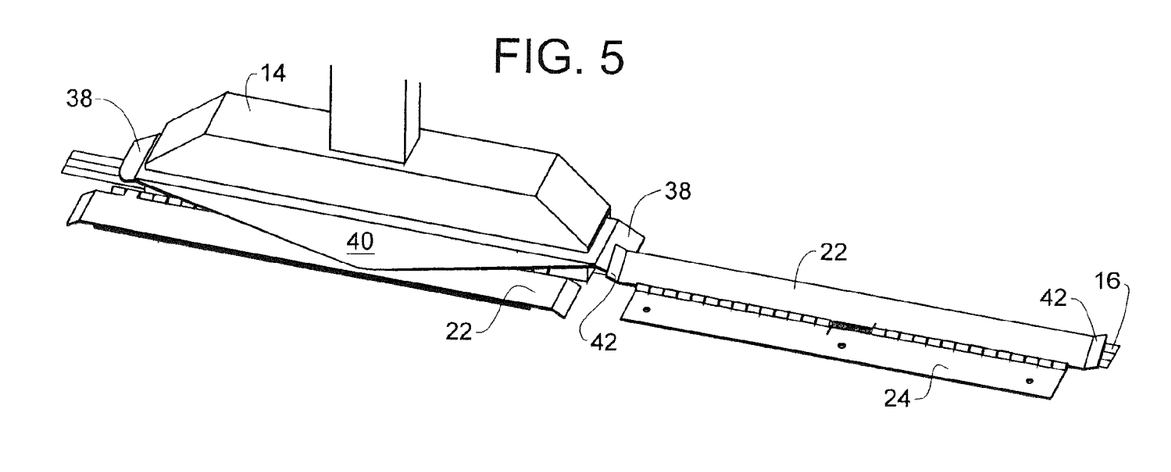
FIGS. 5 through 10 are a sequence that illustrates the movement of a segmented cover as a seat pedestal moves along a seat track.

FIG. 5 illustrates the relative positions of the elements of the embodiment illustrated as a seat is initially moved in a direction from the left of FIG. 5 toward the right. In the position shown in FIG. 5, a lifting end 38 has just engaged under an end of the track cover plate segment 22 and begun to lift the cover. The lifting begins as the lifting end 38 slides under the end of the track cover plate segment 22, and the end of the track cover plate segment slides up the lifting end 38. In the embodiment shown the ends of the track cover plate segment 22 are preferably slightly upturned as shown at 42 so the lifting end 38 can easily slide under the track cover plate segment 22 and lift it as the pedestal moves along the track. It may be noted that the slope of the lifting ends 38 is a matter of design choice but is preferably gentle enough to facilitate easy movement of the seats.

Figure 6:
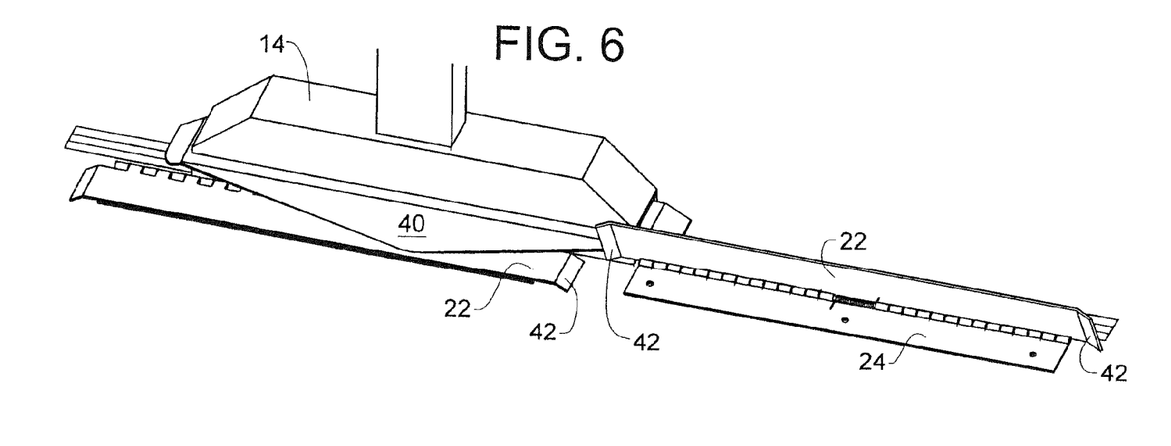

FIG. 6 illustrates engagement between the track cover plate segment 22 and the rotating edge 40 of the lifting plate as the seat pedestal moves further along the track 16. It will be appreciated that the rotating edge 40 is triangular and sloped downward transverse to the track so that the track cover plate segment will rotate 180° from its initial position when it is covering the track 16. The track cover plate segment 22 on the left of FIGS. 5 and 6 is shown in a fully rotated position, lying upside down on the floor of the vehicle over the mounting plate.

In preferred embodiments, the cover segments 22 are arranged so that the spacing between them is about ¹⁄₁₆ inch to ¼ inch so debris does not enter between adjacent ends 42 of two adjacent covers. This gap is illustrated in the drawings somewhat larger for clarity of the drawings.

Figure 7:
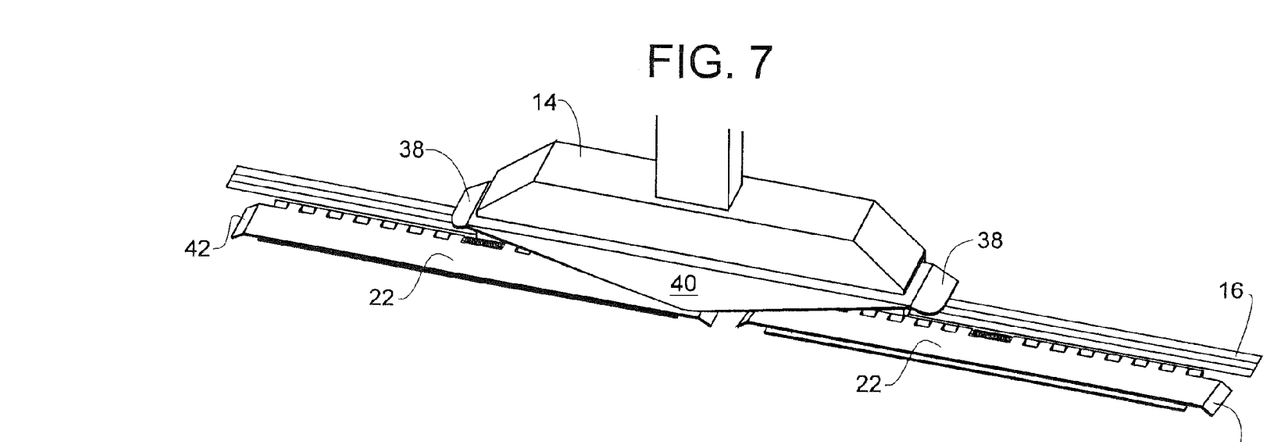
Figure 8:
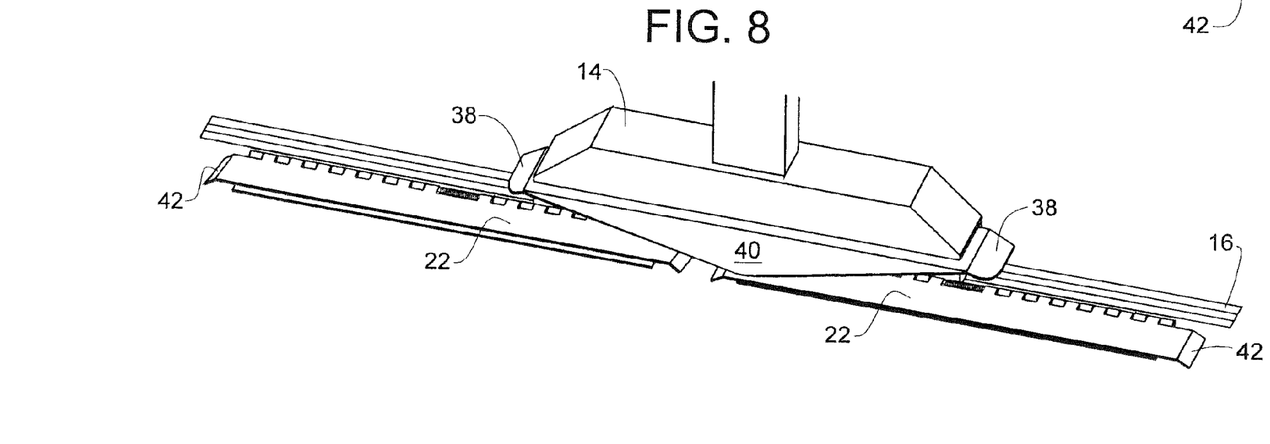
Figure 9:
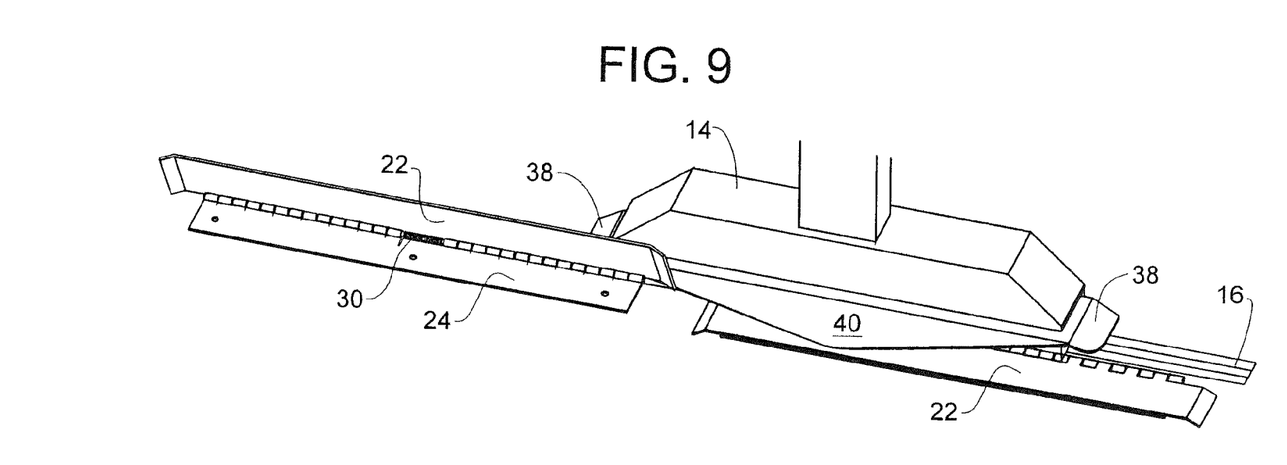
Figure 10:
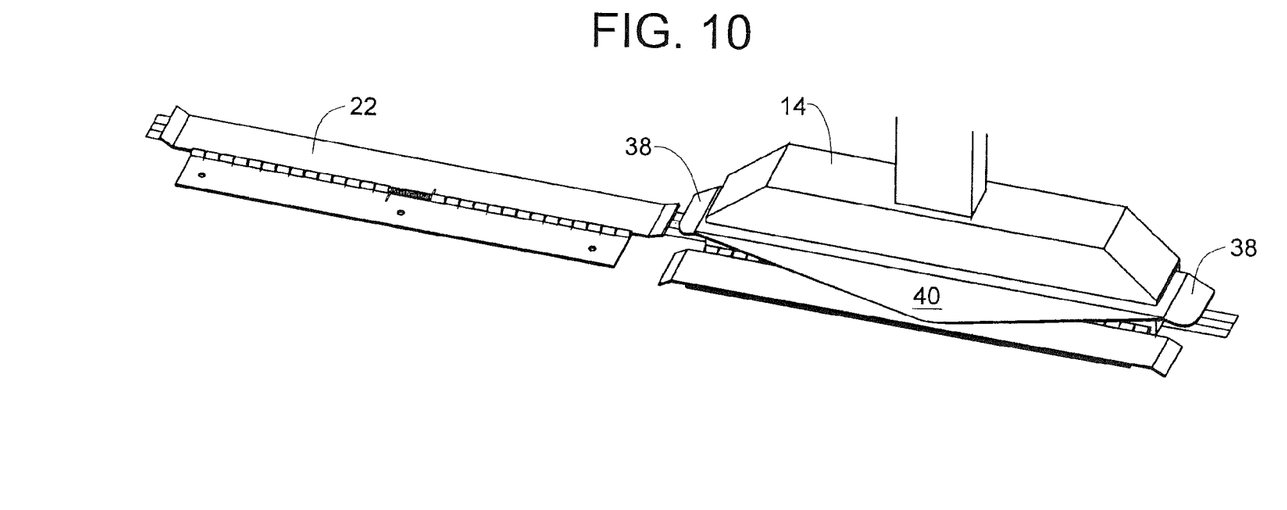

FIGS. 7 and 8 illustrate the positions of the elements as the pedestal 14 moves further along the track 16. The track cover plate segment 22 on the left of FIG. 8 is seen to be beginning to rotate to its track-covering orientation as the spring 30 urges the track cover plate segment upward against the rotating edge 40. FIG. 9 illustrates the further pivoting of the track cover plage segment 22, and FIG. 10 illustrates a completed movement of the seat between two adjacent track cover plate segments 22.

It will be appreciated that cooperation between the movable track cover plate segments 22 and the bases of the pedestals maintain the track in a continuously covered position, with the exception of the very short intervals when the track cover plate segments are being lifted or are returning to their fully covered positions as the seat pedestal moves from one position to another (see FIGS. 5 through 10). In this regard it may be noted that the track cover plate segments described are particularly advantageous when the seats are designed to be locked to the floor of the vehicle at discrete, predetermined locations. This arrangement, for example, as illustrated in FIGS. 1 and 2 is typical in motor coaches. In layouts such as these, the seats are arranged to be either in locations that accommodate ambulatory passengers (FIG. 1) or in locations that accommodate passengers in mobility aids (FIG. 2). Thus, seats 8 and 10 are typically secured to the locations shown in FIG. 1 and moved to the locations of FIG. 2 to accommodate a mobility aid. The discrete track cover plate segments of the invention preferably cooperate with the discrete positions of the seats in that the seat pedestals themselves are then positioned to cover one of the positions. Moreover, if a particular location of the track will always have a chair at that location, there is no need to provide a cover segment for that location. This would be the case for the position to which chair 10 has been moved in FIG. 2. Because the position of chair 10 in FIG. 2 is the same as the position of chair 8 in FIG. 1, that particular location is always covered by a chair pedestal and need not be provided with a track cover plate segment 22. On the other hand, the portions of track 16 not occupied by chairs in FIGS. 1 and 2 do require covers to protect the track.

It will also be appreciated that while the figures show all of the track cover plate segments as being of equal lengths, this is not necessary. For example, if a pedestal base is shorter than the distance between adjacent seat pedestals, the track cover plate segments between the seats may be longer than the track cover plate segments at the seat locations.

Moreover, the concept of the invention can be applied to track cover plate segments that move in other directions, such as laterally, instead of rotationally. For example the track cover plate segments 22 can be attached to the floor of the vehicle or to mounting plates for movement in directions transverse to track 16. Thus, the mounting plates and the track cover plate segments could be provided with interacting elements such as slots and ridges that would allow relative motion laterally. In this modification also the positioning element would be configured to push the cover segments aside laterally as the seat moved along the track.

The invention finds particular utility in retrofitting or refurbishing seating systems to provide covered tracks. When the system is applied to new construction, the cover segments could be mounted directly to the floor of the vehicle, this obviating the need for mounting plates.

Modifications within the scope of the appended claims will be apparent to those of skill in the art.

I claim:

1. In a vehicle having passenger seats and at least one of said seats being mounted on a track and movable along said track between first and second positions, the improvement comprising a track cover comprising a plurality of discrete, individually movable track cover plate segments adjacent each another in the direction of said track, each segment comprising a generally smooth and flat piece of material mounted for movement transverse to said direction of said track between a first position wherein said track cover plate segment extends over said track and along a portion of said track to prevent debris from entering said track and a second position that allows a seat pedestal supporting said at least one of said seats to move along said track, and a positioning element that moves each said track cover plate segment from said first position to said second position in coordination with movement of said seat along said track.

2. A vehicle according to claim 1 wherein said positioning element is mounted to said seat pedestal for movement therewith.

3. A vehicle according to claim 2 wherein said track cover plate segment is mounted for pivotal movement about an axis parallel to said direction of said track.

4. A vehicle according to claim 3 wherein said positioning element comprises a lifting plate that engages said track cover plate segment and rotates said track cover plate segment about said axis to said second position.

5. A vehicle according to claim 4 wherein said plurality of track cover plate segments comprises at least two of said track cover plate segments that are contiguous with each other.

6. A vehicle according to claim 1 wherein the length of a said track cover plate segment is substantially equal to the length of a portion of said seat pedestal adjacent said track.

7. In combination:
elongate element movably mounted to a mounting plate and a return component between said elongate element and said mounting plate, wherein said mounting plate is configured to be secured to a vehicle and said return component is positioned to permit movement of said elongate element with respect to said mounting plate between a first position and a second position and to urge said elongate element from said second position back toward said first position, and a positioning element configured to be attached to a movable seat for engaging said elongate element and moving it from said first position to said second position, wherein said positioning element comprises an upper surface for engaging a seat pedestal, opposed ends that slope downward for engaging said elongate element, and an edge for pivoting said elongate element from said first position to said second position about a hinge connecting said elongate element to said mounting plate.

8. The combination according to claim 7 wherein said elongate element is configured to cover a seat track when in said first position and said positioning element rotates said elongate element by substantially 180° to place said elongate element in said second position.

9. The combination according to claim 8 wherein said mounting plate comprises the floor of a vehicle.

10. The combination according to claim 8 wherein said mounting plate comprises a plate adapted to be attached to the floor of a vehicle.

11. In a vehicle having passenger seats and at least one of said seats being mounted on parallel tracks and movable along said tracks between first and second positions, the improvement comprising a track cover comprising a plurality of cover segments, each segment being mounted for movement transverse to the direction of said tracks between a first position wherein said cover segment extends over a said track to prevent debris from entering said track and a second position that allows a seat pedestal supporting said at least one of said seats to move along said track, and a positioning element that moves each said cover segment from said first position to said second position in coordination with movement of said seat along said track, wherein the length of said cover segment is substantially equal to the length of a portion of said seat pedestal adjacent said track.

* * * * *